(12) United States Patent
Dooley et al.

(10) Patent No.: US 12,229,223 B2
(45) Date of Patent: Feb. 18, 2025

(54) AGENT ENVIRONMENT CO-CREATION USING REINFORCEMENT LEARNING

(71) Applicant: Accenture Global Solutions Limited, Dublin (IE)

(72) Inventors: Robert P. Dooley, Dublin, CA (US); Dylan James Snow, Concord, CA (US)

(73) Assignee: Accenture Global Solutions Limited, Dublin (IE)

( * ) Notice: Subject to any disclaimer, the term of this patent is extended or adjusted under 35 U.S.C. 154(b) by 1019 days.

(21) Appl. No.: 16/919,388

(22) Filed: Jul. 2, 2020

(65) Prior Publication Data

US 2022/0004814 A1  Jan. 6, 2022

(51) Int. Cl.
| | | |
|---|---|---|
| G06F 9/451 | (2018.01) | |
| G06F 18/21 | (2023.01) | |
| G06F 18/214 | (2023.01) | |
| G06F 18/2413 | (2023.01) | |

(52) U.S. Cl.
CPC .......... *G06F 18/2413* (2023.01); *G06F 9/453* (2018.02); *G06F 18/2148* (2023.01); *G06F 18/2163* (2023.01); *G06F 18/217* (2023.01)

(58) Field of Classification Search
CPC .. G06F 18/2413; G06F 9/453; G06F 18/2148; G06F 18/2163; G06F 18/217
See application file for complete search history.

(56) References Cited

U.S. PATENT DOCUMENTS

| | | | | |
|---|---|---|---|---|
| 10,792,810 B1* | 10/2020 | Beckman | ................. | B25J 9/163 |
| 10,807,004 B2* | 10/2020 | Aghdaie | ................. | G06Q 10/04 |
| 11,565,709 B1* | 1/2023 | Caldwell | ................ | G06N 3/088 |
| 2017/0213132 A1* | 7/2017 | Hammond | ................ | G06F 8/38 |
| 2018/0286272 A1* | 10/2018 | Mcdermott | ............. | A63F 13/69 |
| 2018/0293498 A1* | 10/2018 | Campos | ................. | G06F 9/451 |
| 2018/0293517 A1* | 10/2018 | Browne | ................. | G06F 8/437 |
| 2018/0357543 A1* | 12/2018 | Brown | ................... | G06N 3/044 |
| 2018/0357552 A1* | 12/2018 | Campos | ................ | G06N 5/043 |
| 2019/0073353 A1* | 3/2019 | Yu | ........................... | G10L 25/30 |
| 2019/0286943 A1* | 9/2019 | Leskovec | ............ | G06F 16/2272 |
| 2019/0291277 A1* | 9/2019 | Oleynik | ................. | B25J 9/1697 |
| 2020/0298128 A1* | 9/2020 | Yannakakis | ........... | G06N 20/10 |

(Continued)

OTHER PUBLICATIONS

Bengio et al. "Curriculum Learning" (2009), Proceedings of the 26th International Conference on Machine Learning, Montreal, Canada, 2009. Copyright 2009, Accessed Sep. 5, 2023 (Year: 2009).*

(Continued)

*Primary Examiner* — Rami R Okasha (74) *Attorney, Agent, or Firm* — Polsinelli PC (57) ABSTRACT

Methods, systems, and apparatus, including computer programs encoded on a computer storage medium, for agent environment co-creation. The methods, systems, and apparatus include actions of determining a success rate of an agent in an environment with a first complexity, determining that the success rate satisfies a complexity change criteria, in response to determining that the success rate satisfies the complexity change criteria, determining a second complexity that has a greater complexity than the first complexity, training the agent in the environment with the second complexity, and providing the agent trained in the environment with the second complexity.

20 Claims, 4 Drawing Sheets

(56) References Cited

U.S. PATENT DOCUMENTS

| | | | | |
|---|---|---|---|---|
| 2021/0064134 A1* | 3/2021 | Rofougaran | .......... | A61B 5/1118 |
| 2022/0347582 A1* | 11/2022 | Russo | .................... | A63F 13/67 |

OTHER PUBLICATIONS

Narvekar et al. "Source Task Creation for Curriculum Learning", (May 9, 2016), Proceedings of the 15th International Conference on Autonomous Agents and Multiagent Systems (AAMAS 2016), Accessed Sep. 5, 2023 (Year: 2016).*

Comi, "How to teach AI to play Games: Deep Reinforcement Learning", (Nov. 15, 2018), Medium, Published in Towards Data Science, https://towardsdatascience.com/how-to-teach-an-ai-to-play-games-deep-reinforcement-learning-28f9b920440a, Accessed Aug. 26, 2023. (Year: 2018).*

Bagnell et al., "Policy Search by Dynamic Programming," Proceedings of the Neural Information Processing Systems Conference, Dec. 8-13, 2003, Vancouver, Canada 8 pages.

Da Silva et al., "Object-Oriented Curriculum Generation for Reinforcement Learning, " Proceedings of the 17th International Conference on Autonomous Agents and MultiAgent Systems (AAMAS), Jul. 10-15, 2018, Stockholm, Sweden, 1026-1034.

Gupta et al., "Cooperative Multi-agent Control Using Deep Reinforcement Learning," Proceedings of the 16th International Conference on Autonomous Agents and MultiAgent Systems (AAMAS), May 8-12, 2017, Sao Paulo, Brazil, 66-83.

Ha, "Reinforcement Learning for Improving Agent Design," Artificial Life, Nov. 20, 2019, 25(4):352-365.

Jaderberg et al., "Human-level performance in first-person multiplayer games with population-based deep reinforcement learning," arXiv, Jul. 3, 2018, arXiv:1807.01281v1, 42 pages.

Kelly, "Unwritten Procedural Modeling with the Straight Skeleton, " Thesis for the degree of Doctor of Philosophy, University of Glasgow, School of Computing Science, May 2013, 257 pages.

Khalifa et al., "PCGRL: Procedural Content Generation via Reinforcement Learning," arXiv, Aug. 13. 2020, arXiv:2001.09212v3, 7 pages.

Liu et al., "Creating Consistent Scene Graphs Using a Probabilistic Grammar," ACM Transactions on Graphics, Nov. 2014, 33(6):211, 12 pages.

Liu, "Analyzing, Optimizing and Synthesizing Scenes by Reasoning About Relationships Between Objects," Dissertation for the degree of Doctor of Philosophy, Princeton University, Department of Computer Science, Sep. 2015, 128 pages.

Matiisen, "Teacher-Student Curriculum Learning," IEEE Transactions on Neural Networks and Learning Systems, Sep. 2019, 31(9):3732-3740.

Merrick et al., "A shape grammar approach to computational creativity and procedural content generation in massively multiplayer online role playing games," Entertainment Computing, Apr. 2013, 4(2):115-130.

Ren et al., "Self-Paced Prioritized Curriculum Learning With Coverage Penalty in Deep Reinforcement Learning," IEEE Transactions on Neural Networks and Learning Systems, Jun. 2018, 29(6):2216-2226.

Shaker, "Intrinsically Motivated Reinforcement Learning: A Promising Framework for Procedural Content Generation," Proceedings of 2016 IEEE Conference on Computational Intelligence and Games (CIG), Sep. 20-23, 2016, Santorini, Greece, 8 pages.

Sportelli et al., "A Probabilistic Grammar for Procedural Content Generation," Proceedings of Non-Classical Models of Automata and Applications (NCMA), Jul. 28-29, 2014, Kassel, Germany, 7 pages.

Svetlik et al., "Autonomous Curriculum Tree Generation for Reinforcement Learning," Proceedings of the 31st AAAI Conference on Artificial Intelligence, Feb. 4-10, 2017, San Francisco, CA, USA, 7 pages.

Volz et al., "Evolving Mario Levels in the Latent Space of a Deep Convolutional Generative Adversarial Network," Proceedings of the Genetic and Evolutionary Computation Conference, Jul. 15-19, 2018, Kyoto, Japan, 221-228.

* cited by examiner

AGENT ENVIRONMENT CO-CREATION USING REINFORCEMENT LEARNING

TECHNICAL FIELD

This disclosure generally relates to agent-based crowd simulation.

BACKGROUND

Systems may train automated, intelligent agents (or "intelligent bots") to simulate the performance of tasks. An intelligent agent may be an autonomous entity which acts upon an environment using observation through sensors and consequent actuators, directing its activity towards achieving goals. Intelligent agents may also learn or use knowledge to achieve their goals. Intelligent agents may be very simple or very complex.

SUMMARY

In general, an aspect of the subject matter described in this specification may involve a process for performing agent-environment co-creation. Agents may be trained using reinforcement learning. Reinforcement learning is an area of machine learning concerned with how software agents ought to take actions in an environment in order to maximize the notion of cumulative reward.

However, reinforcement learning is a tedious process. An agent trained to play soccer would understand that the main point of the game is to score points by moving the soccer ball into the opposition goal without touching it. But dropping an untrained agent into a team, with no experience with any of the intermediate skills, such as dribbling, passing, shooting, moving into empty space, is a recipe for disaster. The untrained agent would be extremely unlikely to learn to do anything as the untrained agent may never perform any actions that result in positive reinforcement.

Having an environment that is co-created with the agent and adapted to the skills of the agent may be hugely beneficial for reinforcement learning. Adapting the environment may allow a user to be hands off and leave the agent and environment to adapt to each other, increasing the chances the agent will learn. For example, a user might use a system that may automatically reduce a complexity of an environment until an agent can learn, and then gradually increases the complexity of the environment as the agent learns more until the agent is fully trained to succeed in the environment at full complexity.

One innovative aspect of the subject matter described in this specification is embodied in a method that includes the actions of determining a success rate of an agent in an environment with a first complexity, determining that the success rate satisfies a complexity change criteria, in response to determining that the success rate satisfies the complexity change criteria, determining a second complexity that has a greater complexity than the first complexity, training the agent in the environment with the second complexity, and providing the agent trained in the environment with the second complexity.

These and other implementations can each optionally include one or more of the following innovative aspects. In certain aspects, determining that the success rate satisfies a complexity change criteria includes determining that the success rate is greater than or equal to a threshold rate. In some implementations, determining the second complexity that has a greater complexity than the first complexity includes selecting a next more complex setting from a variable complexity environment.

In some aspects, training the agent in the environment with a second complexity includes providing, to an agent trainer, the environment with the second complexity and receiving, from the agent trainer, the agent trained in the environment with the second complexity. In certain aspects, determining a success rate of the agent in an environment with a first complexity includes receiving, from the agent trainer, the success rate.

In some aspects, providing the agent trained in the environment with the second complexity includes obtaining a second success rate of the agent in the environment with the second complexity, determining that the second success rate satisfies a completion criteria, and in response to determining that the second success rate satisfies the completion criteria, providing the agent trained in the environment with the second complexity.

In some implementations, actions include determining a second success rate of the agent in an environment with a third complexity, determining that the second success rate satisfies a second complexity change criteria, and in response to determining that the second success rate satisfies the second complexity change criteria, training the agent in the environment with a fourth complexity that is less complex than the third complexity.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference symbols in the various drawings indicate like elements.

DETAILED DESCRIPTION

Figure 1:
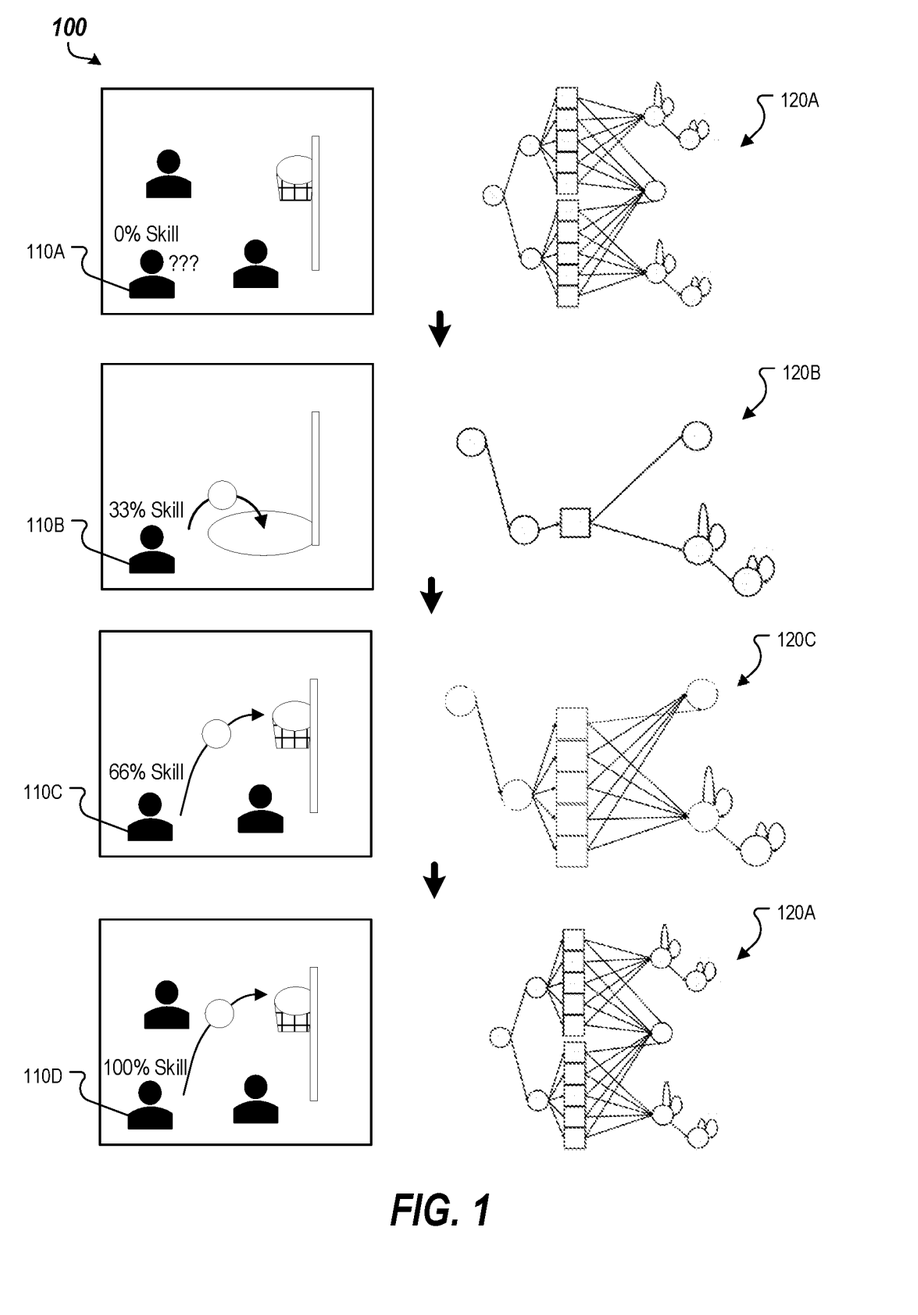
FIG. 1 illustrates a diagram of co-creation of an agent and environment.

FIG. 1 illustrates a diagram 100 of co-creation of an agent 110A-D and an environment 120A-D. Initially, the agent 110A attempts to train in a fully complex environment 120A. The system determines that the agent 110A is unsuccessfully training and, in response, reduces the complexity. The system then trains the agent to a 33% skill in the simplest environment 120B, and then determines to increase the complexity again. The system then trains the agent to a 66% skill in the next complex environment 120C, and then determines to increase the complexity again. The system then trains the agent to a 100% skill in the fully complex environment 120A, and then determines to stop training as the agent is fully trained.

The environment 120 is shown in the form of a graph with nodes and connections between the nodes. An environment may refer to a world in which the agent operates. For example, the environment may define the size of a ball that is to be put in a basket, the height of the basket off the ground, the number of players on each team, etc. The environment may include objects, agents, and production rules. For example, objects may include each team, a ball, a basket, and baseboard, agents may include teammates and opponents, and production rules may include descriptions of which agents belong to which teams, that the agents interact with the ball, etc. In the graph, circles may represent objects, squares may represent agents, and arrows may represent production rules. For example, the environment 120A may show two teams, each with five agents, where each set of five agents interacts with a hoop and a corresponding baseboard, and all the agents interact with a single ball.

As shown, the simplest environment 120B may include a single agent trying to move a basketball within one foot of the agent into a hoop, where the hoop is zero feet off the ground and has a diameter of fifty feet with a baseboard that is five feet high and ten feet wide. The next complex environment 120C may include the agent with four other agents on a same team, where the ball starts more than six feet away from all the agents, the hoop is ten feet off the ground and has a diameter of eighteen inches with a baseboard that is 3.5 feet high and six feet wide. The fully complex environment 120A may include the agent with four other agents on a same team and five other agents on another team, where the ball starts more than six feet away from all the agents, the hoop is ten feet off the ground and has a diameter of eighteen inches with a baseboard that is 3.5 feet high and six feet wide.

Figure 2:
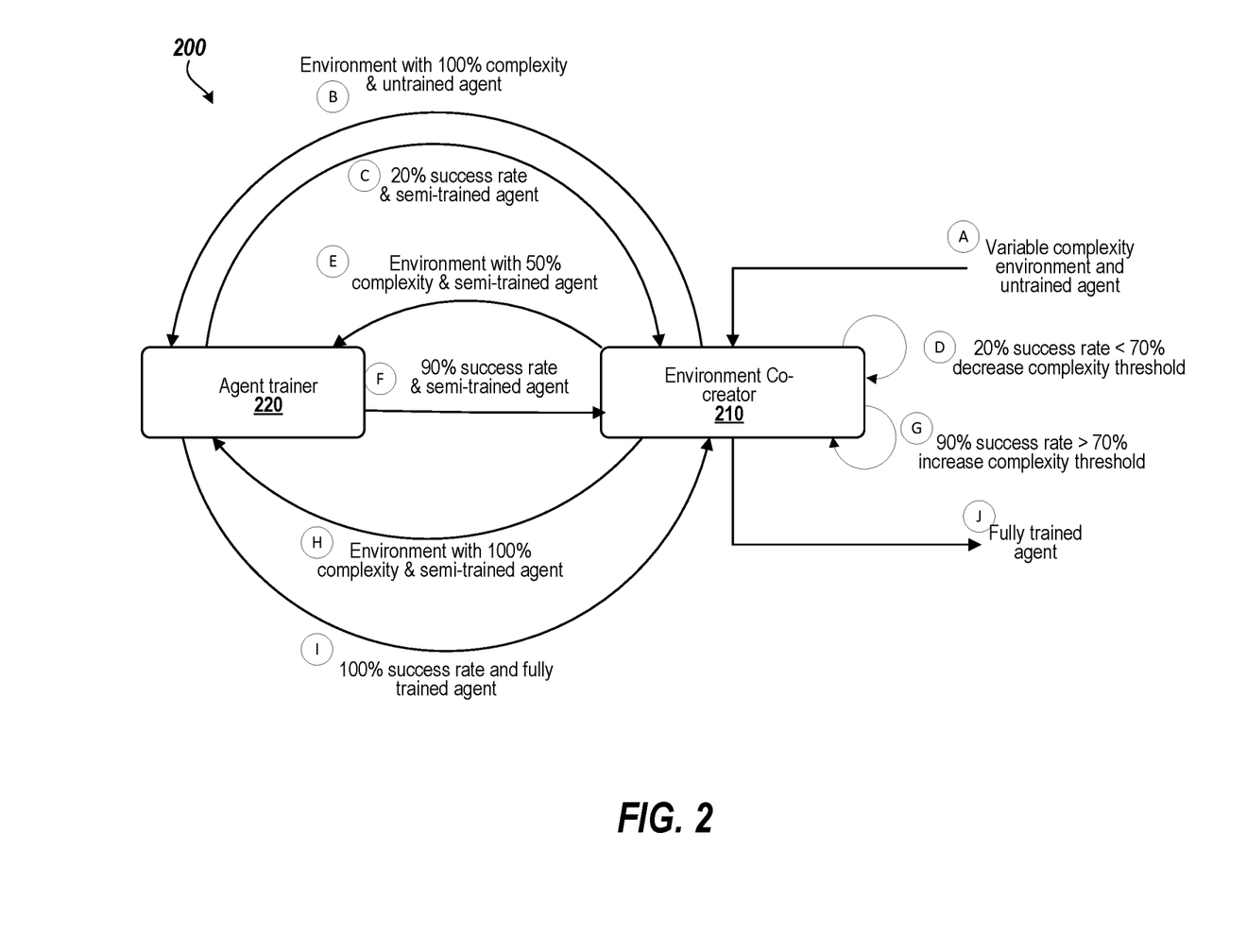
FIG. 2 illustrates a block diagram of an example system for agent environment co-creation.

FIG. 2 illustrates a block diagram of an example system 200 for agent environment co-creation. The system 200 includes an environment co-creator 210 and an agent trainer 220. The environment co-creator 210 may receive a variable complexity environment and an untrained agent (A), interact with the agent trainer 220 to train the agent (B-H), and then provide the trained agent (I).

For example, the environment co-creator 210 may receive a definition for an environment that specifies that an agent is to throw a basketball into a basketball hoop where the number of players, number of teams, size of the basket, height of the basket, size of the baseboard, and starting distance of the ball varies based on complexity, then the co-creator 210 may interact with the agent trainer 220 to train an untrained agent to make a basket in the environment at the environment's highest complexity, and then provide the trained agent for use.

The definition for the environment may define various production rules. For example, a production rule may be that the height of the hoop is ten feet off the ground and another production rule may be that the hoop is zero feet off the ground. In another example, a production rule may be that the number of teammates is one and another production rule may be that the number of teammates is four. The definition for the environment may define how each production rule varies based on complexity for the environment. For example, the definition may define that the height of the hoop is zero at lowest complexity and ten at highest complexity, and that the number of teammates is zero at lowest complexity and four at highest complexity.

Additionally or alternatively, the definition for the environment may define complexity levels and corresponding production rules for each complexity level. For example, the definition of the environment may define that at a lowest complexity level the hoop is zero feet off the ground and there are zero teammates, at a $2^{nd}$ lowest complexity level the hoop is one foot off the ground and there are zero teammates, at a $3^{rd}$ lowest complexity level the hoop is two feet off the ground and there is one teammate, and at a highest complexity level the hoop is ten feet off the ground and there are four teammates.

The environment co-creator 210 may initially provide an environment with first complexity and an untrained agent to the agent trainer (B). For example, the environment co-creator 210 may receive a definition of a basketball game environment and the untrained agent, determine a fully complex environment based on the definition of the basketball game, and provide the fully complex environment and the untrained agent to the trainer 220.

The environment co-creator 210 may then receive a semi-trained agent and an indication of a success rate from the agent trainer 220 (C). For example, the environment co-creator 210 may receive the semi-trained agent and an indication that the success rate of the semi-trained agent is 20%. The environment co-creator 210 may then determine whether the success rate satisfies a complexity change criteria (D). For example, the environment co-creator 210 may determine that the success rate of 20% satisfies a complexity change criteria to decrease the complexity when the success rate is less than 30%, 35%, 40%, or some other amount.

Success may be determined based on a reward function that defines behavior that is rewarded and behavior that is not rewarded. For example, a reward function may define that an agent or an agent's teammate scoring a point is to be rewarded and is considered a success, and losing the ball or missing a throw is not to be rewarded and is considered not a success. The reward function may be specified in the environment provided to the agent trainer 220, and may be kept constant as the complexity of the environment increases or decreases.

In response to determining that the complexity change criteria is satisfied, the environment co-creator 210 may then provide a lower complexity environment and the semi-trained agent to the agent trainer 220 (E). For example, the environment co-creator 210 may provide an environment at 50% complexity with the semi-trained agent to the agent trainer 220.

The environment co-creator 210 may then receive a further trained agent and indication of success rate from the agent trainer 220 in the lower complexity environment (F). For example, the environment co-creator 210 may receive, from the agent trainer 220, a further trained agent and an indication that the success rate is 90% in the lower complexity environment.

The environment co-creator 210 may then determine whether the success rate satisfies a complexity change criteria (G). For example, the environment co-creator 210 may determine that the success rate of 90% satisfies a complexity change criteria to increase the complexity when the success rate is greater than or equal to 60%, 70%, 80%, or some other amount.

In response to determining that the complexity change criteria is satisfied, the environment co-creator 210 may then provide a higher complexity environment and the semi-trained agent to the agent trainer 220 (H). For example, the environment co-creator 210 may provide an environment at 100% complexity with the semi-trained agent to the agent trainer 220.

The environment co-creator 210 may then receive a further trained agent and indication of success rate from the agent trainer 220 in the higher complexity environment (I). For example, the environment co-creator 210 may receive, from the agent trainer 220, a further trained agent and an indication that the success rate is 100% in the 100% complexity environment.

The environment co-creator 210 may repeat increasing and decreasing complexity of the environment as needed until the success rate of the agent in the 100% complex environment satisfies the completion criteria. For example, the environment co-creator 210 may determine that a 100% success rate at 100% complexity satisfies a completion threshold of 95% success rate at 100% complexity. In response to determining the completion criteria is satisfied, the environment co-creator 210 may then provide the trained agent for use (J).

The environment co-creator 210 may increase or decrease the complexity of the environment according to the definition of the environment. The definition of the environment may specify each production rule, a range of each production rule, and which end of the range is more complex and which is more complex. The environment co-creator 210 may then decide which production rules to provide to the agent trainer 220 based on the definition. For example, if lowering a complexity, the environment co-creator 210 may decrease complexity for each production rule based on using a midpoint between a current value for the production rule and the last value for the production rule from which complexity was increased, and when there were no previous increases in complexity for a production rule, then half the current value and the value for the lowest complexity for the production rule.

In some implementations, the environment co-creator 210 may increase or decrease the complexity of some or all of the production rules. For example, the environment co-creator 210 may decrease complexity of only a production rule for hoop size. In another example, the environment co-creator 210 may decrease complexity of both a production rule for hoop size and a production rule for number of teammates, but leave unchanged a complexity of a production rule for baseboard size.

In some implementations, the environment co-creator may randomly select which production rules to change complexity. For example, the environment co-creator 210 may determine to decrease complexity be randomly selecting one, two, or some other proper subset of the production rules.

In some implementations, the definition of the environment may specify which production rules to increase or decrease before others, and the environment co-creator 210 may determine to decrease complexity be increasing or decreasing complexity of the production rules in the order specified. For example, the definition may specify to first reduce complexity in number of opposing player, then number of teammates, then size of baseboard, and then size of hoop, and the environment co-creator may first decrease the number of opposing players, see that the success rate is still too low, then decrease the number of teammates, see that the success rate is still too low, then increase the size of baseboard, etc.

In some implementations, the definition of the environment may specify levels of complexity and corresponding production rules for each level. For example, the definition may specify three levels of complexity, where in the highest level of complexity the production rule for number of opposing teammates is five, the production rule for number of teammates is four, the production rule for the hoop is ten feet off the ground, in the medium level of complexity the production rule for number of opposing teammates is zero, the production rule for number of teammates is four, the production rule for the hoop is ten feet off the ground, and in the lowest level of complexity the production rule for number of opposing teammates is zero, the production rule for number of teammates is zero, the production rule for the hoop is zero feet off the ground. The environment co-creator 210 may then increase or decrease complexity based on selecting the corresponding level of complexity specified by the definition and using the production rules for the level of complexity.

The agent trainer 220 may receive an environment and agent from the environment co-creator 210, train the agent in the environment to increase a success rate of the agent, and then provide the trained agent and indication of the success rate to the environment co-creator 210. In some implementations, the agent may be a neural network and the agent trainer 220 may be an engine that uses reinforcement learning to train the neural network.

In some implementations, the environment co-creator 210 may receive initial rewards or a reward function for the agent to be trained. For example, the reward function may specify that putting a basketball into the hoop is to be rewarded.

In some implementations, the functionality of the environment co-creator 210 and the agent trainer 220 may be combined. For example, the environment co-creator 210 may train the agent itself. In the example, the environment co-creator 210 may determine a success rate of an agent based on a last ten, twenty, fifty or some other number of attempts for the agent, and when the success rate satisfies a decrease complexity threshold, decreases the complexity, when the success rate satisfies an increase complexity threshold, increases a complexity, and when the complexity is at full complexity and the success rate satisfies a completion criteria, stops training and provides the trained agent. In another example, the success rate of the agent may be determined from all attempts for the agent for a particular environment complexity where attempts stop once the agent no longer increases in success rate after twenty, fifty, or some other number of attempts.

Figure 3:
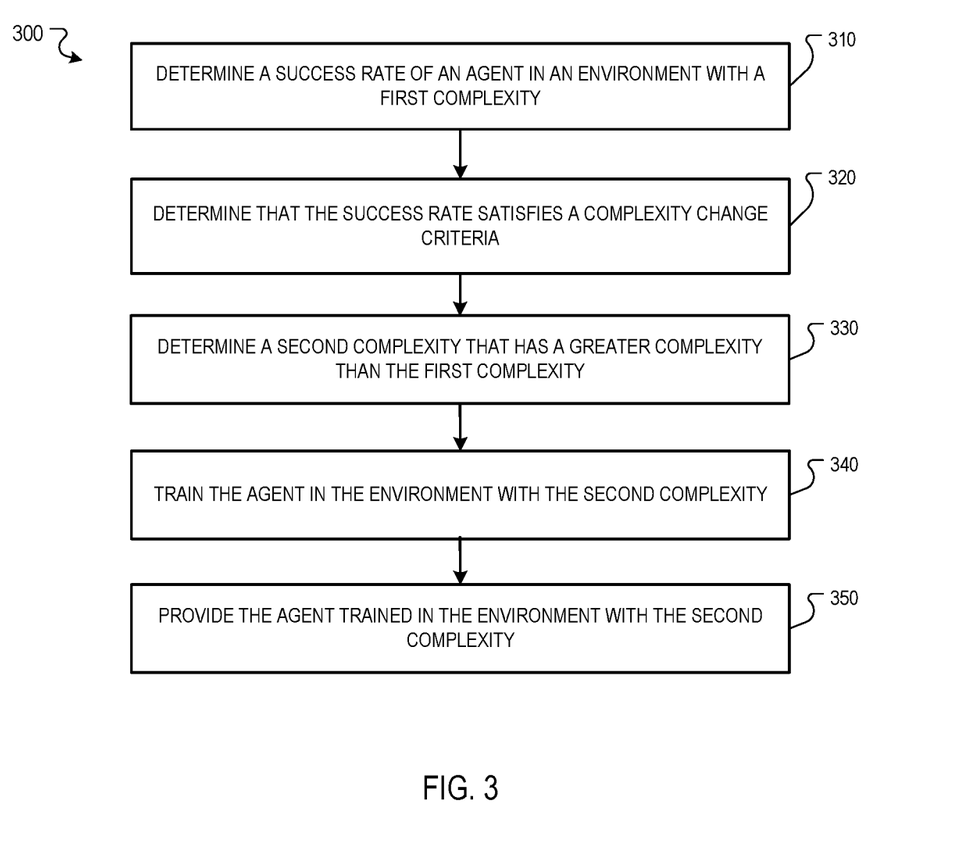
FIG. 3 illustrates a flowchart of an example process for agent environment co-creation.

FIG. 3 illustrates a flowchart of an example process 300 for agent environment co-creation. The process 300 may be performed by the system 200 or some other system.

The process 300 includes determining a success rate of an agent in an environment with a first complexity (310). For example, the environment co-creator 210 may determine a success rate of 20% for an agent in an environment with 100% complexity. In some implementations, determining a success rate of the agent in an environment with a first complexity includes receiving, from the agent trainer, the success rate. For example, the environment co-creator 210 may receive an indication from the agent trainer 220 that the success rate is 90% for an agent in an environment at 50% complexity.

The process 300 includes determining that the success rate satisfies a complexity change criteria (320). For example, the environment co-creator 210 may determine the success rate of 20% satisfies a complexity change criteria. In some implementations, determining that the success rate satisfies a complexity change criteria includes determining that the success rate is greater than or equal to a threshold rate. For example, the environment co-creator 210 may determine that the success rate of 90% satisfies a complexity change criteria of a success rate of 70% or greater resulting in an increase in complexity.

The process 300 includes determining a second complexity that has a greater complexity than the first complexity (330). For example, the environment co-creator 210 may determine the second complexity to have greater complexity than the first complexity based on determining a range of eighteen to fifty inches for a diameter of a hoop, that eighteen is most complex and fifty is least complex, and then increase complexity by using a value for the diameter that is closer towards eighteen inches than a current value.

In some implementations, determining the second complexity to have greater complexity than the first complexity includes selecting a next more complex setting from a variable complexity environment. For example, the definition for the environment may specify levels of complexity and corresponding production rules for each level, and the environment co-creator 210 may determine a level of complexity that the agent was just trained at, determine the next closest level of complexity that is higher complexity, and then determine the second complexity from the productions for the next closest level of complexity.

The process 300 includes training the agent in the environment with a second complexity (340). For example, the agent may be trained in an environment with 100% complexity after the agent was trained in an environment with 50% complexity. In some implementations, training the agent in the environment with a second complexity includes providing, to an agent trainer, the environment with the second complexity receiving, from the agent trainer, the agent trained in the environment with the second complexity. For example, the environment co-creator 210 may provide a partially trained agent and the environment with 100% complexity to the agent trainer 220 and, in response, receive the fully trained agent from the agent trainer 220.

The process 300 includes providing the agent trained in the environment with the second complexity (350). For example, the environment co-creator 210 may provide the trained agent back to a requestor that provided the variable complexity environment and untrained agent, and the requestor may then deploy the trained agent. In another example, the environment co-creator 210 may provide the trained agent by deploying the trained agent.

In some implementations, providing the agent trained in the environment with the second complexity includes obtaining a second success rate of the agent in the environment with the second complexity, determining that the second success rate satisfies a completion criteria, and in response to determining that the second success rate satisfies the completion criteria, providing the agent trained in the environment with the second complexity. For example, the environment co-creator 210 may determine that an agent had a success rate of 100% with an environment at 100% complexity which satisfies a completion criteria of greater than 95% success rate at 100% complexity and, in response, provide the agent for use.

In some implementations, the process 300 includes determining a second success rate of the agent in an environment with a third complexity, determining that the second success rate satisfies a second complexity change criteria, and in response to determining that the second success rate satisfies the second complexity change criteria, training the agent in the environment with a fourth complexity that is less complex than the third complexity. For example, the environment co-creator 210 may determine that a success rate of 20% with an environment at 100% complexity, determine that the success rate of 20% satisfies a decrease complexity threshold, and, in response, train the agent in an environment at 50% complexity.

Figure 4:
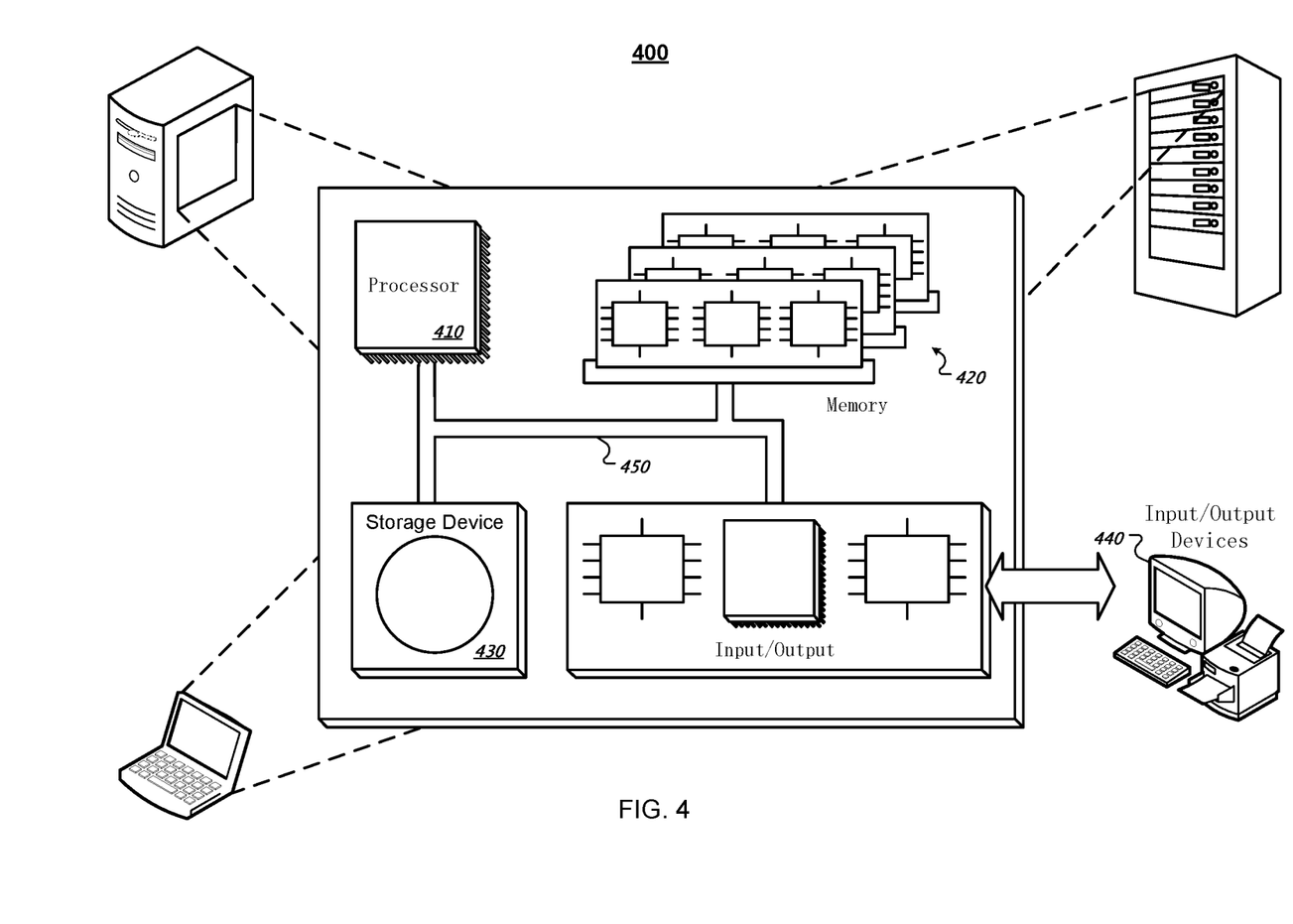
FIG. 4 illustrates a schematic diagram of an exemplary generic computer system.

FIG. 4 illustrates a schematic diagram of an exemplary generic computer system 400. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, a solid state drive, an optical disk device, a tape device, a universal serial bus stick, or some other storage device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps that can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used directly or indirectly in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard, and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. The servers may be part of a cloud, which may include ephemeral aspects.

What is claimed is:
1. A computer-implemented method, comprising:
receiving a request that includes an untrained virtual agent from a requestor, wherein the untrained virtual agent is a neural network;
obtaining an environment definition that is used to programmatically generate synthesized training environments for training agents to perform a skill that includes multiple intermediate skills, the synthesized training environments being programmatically generated based on production rules that, for each of multiple training environment complexities, define objects and relationships between the objects, and the production rules for different training environment complexities having different reward functions that reward agents for successfully completing different intermediate skills;
obtaining, from the environment definition, initial production rules for an initial training complexity that is associated with an initial reward function that rewards virtual agents for successfully completing an initial intermediate skill;
generating an initial synthesized training environment using the initial production rules for the initial training complexity;
training, using reinforcement learning, the neural network corresponding to the untrained virtual agent to perform a particular task in the initial synthesized training environment;
determining a training success rate of the virtual agent in performing the particular task in the initial synthesized training environment using an initial reward function associated with completing the initials intermediate skill;
before the virtual agent has completed the initial intermediate skill, determining that the training success rate of the virtual agent in performing the particular task in the initial synthesized training environment satisfies criteria associated with increasing or decreasing training environment complexity to provide subsequent training complexity, wherein determining that the training success rate satisfies the criteria includes:
determining that the training success rate satisfies the criteria associated with the increasing training environment complexity when the training success rate is greater than or equal to a threshold rate, or
determining that the training success rate satisfies the criteria associated with the decreasing training environment complexity when the training success rate is lesser than the threshold rate, wherein decreasing the training environment complexity for each production rule is based on one or more of:
a midpoint between a current value for the production rule and a last value for the lowest complexity for the production rule from which complexity being increased, and
a half of the current value and the value for the lowest complexity for the production rule;
obtaining subsequent production rules for the subsequent training complexity, that is greater or lesser than the initial training complexity, based on the determination of the training success rate associated with the increasing or decreasing training complexity and that is associated with a reward function that rewards virtual agents for successfully completing the initial intermediate skill and one or more different intermediate skills;
generating a subsequent synthesized training environment using the subsequent production rules for the subsequent synthesized training environment complexity:
training, using the reinforcement learning, the neural network corresponding to the virtual agent that has not completed the initial intermediate skill to perform the particular task in the subsequent synthesized training environment;
determining a training success rate of the virtual agent in performing the particular task in the subsequent synthesized training environment using the reward function associated with successfully completing the initial intermediate skill and the one or more different intermediate skills;
determining that the training success rate of the virtual agent in performing the initial intermediate skill and the one more different intermediate skills that are associated with the particular task in the subsequent synthesized training environment satisfies criteria associated with completing training; and
providing the virtual agent that was trained in the subsequent synthesized training environment to the requestor in response to the request.

2. The method of claim 1, comprising,
selecting the subsequent training complexity from among multiple training complexities that have not been selected for the virtual agent.

3. The method of claim 1, wherein training the virtual agent in the subsequent synthesized training environment comprises:
providing, to an agent trainer device, the subsequent synthesized training environment; and
receiving, from the agent trainer device, the virtual agent trained in the subsequent synthesized training environment.

4. The method of claim 1, wherein the virtual agent is trained to perform the particular task in the initial synthesized training environment after failing to satisfy a training success rate in the subsequent synthesized training environment.

5. The method of claim 1, wherein obtaining the initial production rules comprises selecting a production rule value based on a range of values specified for a particular production rule.

6. The method of claim 1, wherein obtaining the initial production rules comprises selecting a first quantity of a set of production rules in the environment definition, the first quantity being based on the initial training complexity.

7. The method of claim 1, wherein obtaining the initial production rules comprises dynamically generating a production rule value based on a range of values specified for a particular production rule.

8. A system comprising:
one or more processors and one or more storage devices storing instructions that are operable, when executed by the one or more processors, to cause the one or more computers to perform operations comprising:
receiving a request that includes an untrained virtual agent from a requestor, wherein the untrained virtual agent is a neural network;
obtaining an environment definition that is used to programmatically generate synthesized training environments for training agents to perform a skill that includes multiple intermediate skills, the synthesized training environments being programmatically generated based on production rules that, for each of multiple training environment complexities, define objects and relationships between the objects, and the production rules for different training environment complexities having different reward functions that reward agents for successfully completing different intermediate skills;
obtaining, from the environment definition, initial production rules for an initial training complexity that is associated with an initial reward function that rewards virtual agents for successfully completing an initial intermediate skill;
generating an initial synthesized training environment using the initial production rules for the initial training complexity;
training, using reinforcement learning, the neural network corresponding to the untrained virtual agent to perform a particular task in the initial synthesized training environment;
determining a training success rate of the virtual agent in performing the particular task in the initial synthesized training environment using the initial reward function associated with completing the initials intermediate skill;
before the virtual agent has completed the initial intermediate skill, determining that the training success rate of the virtual agent in performing the particular task in the initial synthesized training environment satisfies criteria associated with increasing or decreasing training environment complexity to provide subsequent training complexity, wherein determining that the training success rate satisfies the criteria includes:
determining that the training success rate satisfies the criteria associated with the increasing training environment complexity when the training success rate is greater than or equal to a threshold rate, or
determining that the training success rate satisfies the criteria associated with the decreasing training environment complexity when the training success rate is lesser than the threshold rate, wherein decreasing the training environment complexity for each production rule is based on one or more of:
a midpoint between a current value for the production rule and a last value for the lowest complexity for the production rule from which complexity being increased, and
a half of the current value and the value for the lowest complexity for the production rule;
obtaining subsequent production rules for the subsequent training complexity, that is greater or lesser than the initial training complexity, based on the determination of the training success rate associated with the increasing or decreasing training complexity and that is associated with a reward function that rewards virtual agents for successfully completing the initial intermediate skill and one or more different intermediate skills;
generating a subsequent synthesized training environment using the subsequent production rules for the subsequent synthesized training environment complexity;
training, using reinforcement learning, the neural network corresponding to the virtual agent that has not completed the initial intermediate skill to perform the particular task in the subsequent synthesized training environment;
determining a training success rate of the virtual agent in performing the particular task in the subsequent synthesized training environment using the reward function associated with successfully completing the initial intermediate skill and the one or more different intermediate skills;
determining that the training success rate of the virtual agent in performing the initial intermediate skill and the one more different intermediate skills that are associated with the particular task in the subsequent synthesized training environment satisfies criteria associated with completing training; and
providing the virtual agent that was trained in the subsequent synthesized training environment to the requestor in response to the request.

9. The system of claim 8, wherein the operations comprise: selecting the subsequent training complexity from among multiple training complexities that have not been selected for the virtual agent.

10. The system of claim 8, wherein training the virtual agent in the subsequent synthesized training environment comprises:
providing, to an agent trainer device, the subsequent synthesized training environment; and
receiving, from the agent trainer device, the virtual agent trained in the subsequent synthesized training environment.

11. The system of claim 8, wherein the virtual agent is trained to perform the particular task in the initial synthesized training environment after failing to satisfy a training success rate in the subsequent synthesized training environment.

12. The system of claim 8, wherein obtaining the initial production rules comprises selecting a production rule value based on a range of values specified for a particular production rule.

13. The system of claim 8, wherein obtaining the initial production rules comprises selecting a first quantity of a set of production rules in the environment definition, the first quantity being based on the initial training complexity.

14. The system of claim 8, wherein obtaining the initial production rules comprises dynamically generating a production rule value based on a range of values specified for a particular production rule.

15. A non-transitory computer-readable medium storing software comprising instructions executable by one or more computers which, upon such execution, cause the one or more computers to perform operations comprising:
   receiving a request that includes an untrained virtual agent from a requestor, wherein the untrained virtual agent is a neural network;
   obtaining an environment definition that is used to programmatically generate synthesized training environments for training agents to perform a skill that includes multiple intermediate skills, the synthesized training environments being programmatically generated based on production rules that, for each of multiple training environment complexities, define objects and relationships between the objects, and the production rules for different training environment complexities having different reward functions that reward agents for successfully completing different intermediate skills;
   obtaining, from the environment definition, initial production rules for an initial training complexity that is associated with an initial reward function that rewards virtual agents for successfully completing an initial intermediate skill;
   generating an initial synthesized training environment using the initial production rules for the initial training complexity;
   training, using reinforcement learning, the neural network corresponding to the untrained virtual agent to perform a particular task in the initial synthesized training environment;
   determining a training success rate of the virtual agent in performing the particular task in the initial synthesized training environment using the initial reward function associated with completing the initials intermediate skill;
   before the virtual agent has completed the initial intermediate skill, determining that the training success rate of the virtual agent in performing the particular task in the initial synthesized training environment satisfies criteria associated with increasing or decreasing training environment complexity to provide subsequent training complexity, wherein determining that the training success rate satisfies the criteria includes:
      determining that the training success rate satisfies the criteria associated with the increasing training environment complexity when the training success rate is greater than or equal to a threshold rate, or
      determining that the training success rate satisfies the criteria associated with the decreasing training environment complexity when the training success rate is lesser than the threshold rate, wherein decreasing the training environment complexity for each production rule is based on one or more of:
         a midpoint between a current value for the production rule and a last value for the lowest complexity for the production rule from which complexity being increased, and
         a half of the current value and the value for the lowest complexity for the production rule;
   obtaining subsequent production rules for the subsequent training complexity that is greater or lesser than the initial training complexity, based on the determination of the training success rate associated with the increasing or decreasing training complexity and that is associated with a reward function that rewards virtual agents for successfully completing the initial intermediate skill and one or more different intermediate skills;
   generating a subsequent synthesized training environment using the subsequent production rules for the subsequent synthesized training environment complexity;
   training, using the reinforcement learning, the neural network corresponding to the virtual agent that has not completed the initial intermediate skill to perform the particular task in the subsequent synthesized training environment;
   determining a training success rate of the virtual agent in performing the particular task in the subsequent synthesized training environment using the reward function associated with successfully completing the initial intermediate skill and the one or more different intermediate skills;
   determining that the training success rate of the virtual agent in performing the initial intermediate skill and the one more different intermediate skills that are associated with the particular task in the subsequent synthesized training environment satisfies criteria associated with completing training; and
   providing the virtual agent that was trained in the subsequent synthesized training environment to the requestor in response to the request.

16. The medium of claim 15, wherein the operations comprise:
   selecting the subsequent training complexity from among multiple training complexities that have not been selected for the virtual agent.

17. The medium of claim 15, wherein training the virtual agent in the subsequent synthesized training environment comprises:
   providing, to an agent trainer device, the subsequent synthesized training environment; and
   receiving, from the agent trainer device, the virtual agent trained in the subsequent synthesized training environment.

18. The medium of claim 15, wherein the virtual agent is trained to perform the particular task in the initial synthesized training environment after failing to satisfy a training success rate in the subsequent synthesized training environment.

19. The medium of claim 15, wherein obtaining the initial production rules comprises selecting a production rule value based on a range of values specified for a particular production rule.

20. The medium of claim 15, wherein obtaining the initial production rules comprises selecting a first quantity of a set of production rules in the environment definition, the first quantity being based on the initial training complexity.

* * * * *